(12) United States Patent
Kim et al.

(10) Patent No.: US 9,272,273 B2
(45) Date of Patent: Mar. 1, 2016

(54) VERTICALLY ALIGNED MESOPOROUS THIN FILM, METHOD OF MANUFACTURING THE SAME, AND CATALYTIC APPLICATION THEREOF

(71) Applicant: POSTECH ACADEMY-INDUSTRY FOUNDATION, Pohang-si (KR)

(72) Inventors: Dong-Pyo Kim, Pohang-si (KR); Kottagalu Chikkalingaiah Basavaraju, Pohang-si (KR)

(73) Assignee: POSTECH ACADEMY-INDUSTRY FOUNDATION, Gyungbuk (KR)

( * ) Notice: Subject to any disclaimer, the term of this patent is extended or adjusted under 35 U.S.C. 154(b) by 0 days.

(21) Appl. No.: 14/168,660

(22) Filed: Jan. 30, 2014

(65) Prior Publication Data
US 2014/0221195 A1 Aug. 7, 2014

(30) Foreign Application Priority Data

Feb. 2, 2013 (KR) .................. 10-2013-0012098
Apr. 4, 2013 (KR) .................. 10-2013-0037072

(51) Int. Cl.
| | | |
|---|---|---|
| B01J 21/00 | (2006.01) | |
| B01J 25/00 | (2006.01) | |
| B01J 29/00 | (2006.01) | |
| B01J 31/00 | (2006.01) | |
| B01J 23/00 | (2006.01) | |
| B01J 31/06 | (2006.01) | |
| B01J 23/52 | (2006.01) | |

(Continued)

(52) U.S. Cl.
CPC ........... B01J 31/069 (2013.01); B01J 23/44 (2013.01); B01J 23/50 (2013.01); B01J 23/52 (2013.01); B01J 37/0207 (2013.01); B01J 2231/30 (2013.01); B01J 2231/44 (2013.01); B01J 2231/64 (2013.01); B01J 2231/72 (2013.01); B01J 2231/76 (2013.01)

(58) Field of Classification Search
USPC .................................. 502/100, 150, 158
See application file for complete search history.

(56) References Cited

U.S. PATENT DOCUMENTS

| 2007/0098884 | A1* | 5/2007 | Hasskerl et al. ............... 427/180 |
| 2010/0254890 | A1* | 10/2010 | Yang et al. ................ 423/592.1 |

(Continued)

OTHER PUBLICATIONS

Plinio Innocenzi et al., "Order-Disorder in Self-Assembled Mesostructured Silica Films: A Concepts Review," *Chemistry Materials Review* 2009, 21, 2555-2564.

(Continued)

*Primary Examiner* — James McDonough
(74) *Attorney, Agent, or Firm* — Steptoe & Johnson LLP

(57) ABSTRACT

This invention relates to a vertically aligned mesoporous silicate film with site-selective metal deposition from a single polymeric precursor and to diverse catalytic applications thereof. There is an innovative approach of a single precursor to manufacture a vertically aligned mesoporous silicate thin film having high thermal and chemical resistance on a large-area silicon wafer (2 cm×3 cm). A precisely designed organic-inorganic block copolymer (BCP) polyethyleneoxide-ss-polyvinylcyclicsilazane (PEO-ss-PVCSZ) with a disulfide bridge that is chemically cleavable is newly synthesized as the single precursor for an oriented silicate nanoporous film, and using such a precursor, solvent annealing, self-assembling, block cleaving treatment, and then hydrolysis conversion of a polymer into a siliceous phase at room temperature are carried out, thus directly forming a mesostructure on the substrate.

11 Claims, 15 Drawing Sheets

(51) Int. Cl.
  *B01J 23/50* (2006.01)
  *B01J 23/44* (2006.01)
  *B01J 37/02* (2006.01)

(56) References Cited

U.S. PATENT DOCUMENTS

2011/0118107 A1* 5/2011 Garcia-Martinez et al. .... 502/62
2011/0130478 A1* 6/2011 Warren et al. ................ 521/153
2013/0112605 A1* 5/2013 Wyndham et al. ......... 210/198.3

OTHER PUBLICATIONS

A. Walcarius et al., "Electrochemically assisted self-assembly of mesoporous silica thin films," *Nature Publishing Group* Aug. 2007, vol. 6 pp. 602-608.
Sivakumar Nagarajan et al., "An Efficient Route to Mesoporous Silica Films with Perpendicular Nanochannels," *Advanced Materials* 2008, pp. 246-251.
Erik K. Richman et al., "Vertically oriented hexagonal mesoporous films formed through nanometer-scale epitaxy," *Nature Materials Letters* Sep. 2008, vol. 7, pp. 712-717.
Akira Yamaguchi et al., "Self-assembly of a silica-surfactant nanocomposite in a porous alumina membrane," *Nature Materials Articles*, May 2004, vol. 3, pp. 337-341.
Erik M. Freer et al., "Oriented Mesoporous Organosilicate Thin Films," *American Chemical Society Nano Letters* 2005 vol. 5, No. 10 pp. 2014-2018.
Ji Xu et al., "Fabrication of Silicon Oxide Nanodots with an Areal Density Beyond 1 Teradots Inch-2," *Advanced Materials* 2011, 23, pp. 5755-5761.
Dongyuan Zhao et al., "Continuous Mesoporous Silica Films with Highly Ordered Large Pore Structures," *Advanced Materials* 1998, 10, No, 16, pp. 1380-1385.
Soojin Park et al., "Fabrication of Highly Ordered Silicon Oxide Dots and Stripes from Block Copolymer Thin Films," *Advanced Materials* 2008, 20, pp. 681-685.
Sarah H. Tolbert et al., "Magnetic Field Alignment of Ordered Silicate-Surfactant Composites and Mesoporous Silica," *Science* vol. 278, Oct. 10, 2007, pp. 264-268.
Yusuke Yamauhi et al., "Orientation of mesochannels in continuous mesoporous silica films by a high magnetic field," *Journal of Material Chemistry* 2005, 15, pp. 1137-1140.
Qingyi Lu et al., "Ordered SBA-15 Nanorod Arrays Inside a Porous Alumina Membrane," *JACS Communications* 2004, 126, pp. 8650-8651.
Min Wang et al., "Gold nanoparticles confined in the interconnected carbon foams with high temperature stability," *Chem. Communication.*, 2012, 48, pp. 10404-10406.
C. Jeffrey Brinker et al., "Morphological control of surfactant-templated metal oxide films," *Current Opinion in Colloid and Interface Science* 2006, pp. 126-132.
Quoc Dat Nghiem et al., "Synthesis of Inorganic-Organic Diblock Copolymers as a Precursor of Ordered Mesoporous SiCN Ceramic," *Advanced Materials* 2007, 19, pp. 2351-2354.
Quoc Dat Nghiem et al., "Controlled/ Living Radical Polymerization of Vinylcyclicsilazane by RAFT Process and Their Block Copolymers," *Journal of Polymer Science: Part A: Polymer Chemistry* 2008, vol. 46, pp. 4594-4601.
Chi Thanh Nguyen et al., "An inorganic-organic diblock copolymer photoresist for direct mesoporous SiCN ceramic patterns via photolithography," *Chem. Communication* 2011, 47, pp. 3484-3486.
Ja-Hyoung Ryu et al., "Highly Ordered Gold Nanotubes Using Thiols at a Cleavable Block Copolymer Interface," *JACS Communications* 2009, 131, pp. 9870-9871.
M. W. Matsen et al., "Unifying Weak- and Strong-Segregation Block Copolymer Theories," *Macromolecules* 1996, vol. 29, No. 4.
Joona Bang et al., "Effect of Humidity on the Ordering of PEO-Based Copolymer Thin Films," *Macromolecules* 2007, 40 (19), pp. 7019-7025.
Cristina Della Pina et al., "Selective oxidation using gold," *Chemical Society Review* 2008, 37, pp. 2077-2095.
A. Stephen K. Hashmi et al., "Gold Catalysis," *Angewandte Chemie* 2006, 45, pp. 7896-7936.
John T. Lai et al., "Functional Polymers from Novel Carboxyl-Terminated Trithiocarbonates as Highly Efficient RAFT Agents," *Molecules* 2002, 35, pp. 6754-6756.
Soojin Park et al., "Macroscopic 10-Terabit-per-Square-Inch Arrays from Block Copolymers with Lateral Order," *Science* 2009 vol. 323, pp. 1030-1033.
T. Thurn-Albrecht et al., "Ultrahigh-Density Nanowire Arrays Grown in self-Assembled Diblock Copolymer Templates," *Science* 2000, 290, pp. 2126-2129.
Fengxiao Guo et al., "Influence of 1, 2-PB Matrix Cross-Linking on Structure and Properties of Selectively Etched 1, 2-PB-b-PDMS Block Copolymers," *Macromolecules* 2007, 40, pp. 3669-3675.
Mario Rodriguez-Baeza et al., "Synthesis of poly [(methylsiloxane)-co-(dimethylsilazane)] copolymers as precursors of ceramic materials," *Polymer Bulletin* 2003, 50, pp. 25-32.
Dong-Hoon Choi et al., "Use of Columnar Metal Thin Film as a Nanosieve with Sub-10 nm Pores," *Advanced Materials* 2012, 24, pp. 4408-4413.
Serkan Yurt et al., "Scission of Diblock Copolymers into Their Constituent Blocks," *Macromolecules* 2006, 39, pp. 1670-1672.
Akamol Klaikherd et al., "A Facile Method for the Synthesis of Cleavable Block Copolymers from ATRP-Based Homopolymers," *Macromolecules* 2007, 40, pp. 8518-8520.
Tomoko Kubo et al., "Conversion of Perhydropolysilazane-to-Silica Thin Films by Exposure to Vapor from Aqueous Ammonia at Room Temperature," *Journal of the Ceramic Society of Japan* 2006, 114, [6], pp. 517-523.
Ming Li et al., "Silicate glass coated microchannels through a phase conversion process for glass-like electrokinetic performance," *Lab Chip*, 2011, 11, pp. 1126-1131.
Qingling Fang et al., "Direct pattern transfer using an inorganic polymer-derived silicate etch mask," *J. Mater. Chem.*, 2011, pp. 4657-4662.
Sungjune Park et al., "Non-sticky silicate replica mold by phase conversion approach for nanoimprint lithography applications," *J. Mater. Chem.*, 2010, 20, pp. 9962-9967.
Joongoo Lee et al., "A Nanoreactor Framework of a Au@SiO2 Yolk/Shell Structure for Catalytic Reduction of p-Nitrophenol," *Advanced Materials* 2008, 20, pp. 1523-1528.
N. S. Patil et al., "Epoxidation of styrene by anhydrous t-butyl hydroperoxide over gold supported on Al2O3, Ga2O3, In2O3 and Tl2O3," *Applied Catalysis A: General* 2004, 275, pp. 87-93.
Richard M. Lambert et al., "Heterogeneous alkene epoxidation: past, present and future," *Journal of Molecular Catalysis A: Chemical* 2005, 228, pp. 27-33.
Mathew D. Hughes et al., "Tunable gold catalysts for selective hydrocarbon oxidation under mild conditions," *Nature* vol. 437, 2005, pp. 1132-1135.
Manuel Ojeda et al., "Formic Acid Dehydrogenation on Au-Based Catalysts at Near-Ambient Temperatures," *Angew. Chem. Int. Ed.* 2009, 48, pp. 4800-4803.
Avelino Corma et al., "Chemoselective Hydrogenation of Nitro Compounds with Supported Gold Catalysts," *Science* 2006, vol. 313, pp. 332-334.

* cited by examiner

VERTICALLY ALIGNED MESOPOROUS THIN FILM, METHOD OF MANUFACTURING THE SAME, AND CATALYTIC APPLICATION THEREOF

TECHNICAL FIELD

The present invention relates to a vertically aligned mesoporous thin film and a method of manufacturing the same, and more particularly, to a vertically aligned mesoporous silicate film with site-selective metal deposition from a single polymeric precursor, and to a method of manufacturing the same and diverse catalytic applications thereof.

BACKGROUND ART

Compared to unstable organic mesostructured materials, 3D inorganic materials at the nano-scale may be sculpted by the cooperative interactions of large organic molecules and soluble inorganic precursors, which give birth to a variety of durable mesostructured materials. In particular, silica, silicate and metal oxide are mesostructured materials which have been researched widely via various sol-gel chemical processes. Silica-based mesostructures are typically granular or powder types of products that have been synthesized from the co-assembly of binary organic-inorganic mixtures such as tetraethylorthosilicate (TEOS), structural directing agents such as surfactants, and amphiphilic block copolymer (BCP). Serial processes of solvent evaporation, subsequent treatment such as surface reconstruction, calcination, and in some cases thermal & high pressure treatment, always involve severe volume shrinkage.

Hence, one of the critical issues in silica-based mesostructures is orientation of pores and morphology in a continuous thin film on substrates. However, the pores aligned along the substrate plane are less suitable for the easy accessibility of analytes into the substrate which is necessary for separation and catalytic applications. Thus, many material scientists have endeavored to manufacture vertically oriented hexagonal mesoporous thin films because of their tremendous applicability in the fields of catalysis, optics, biosensors and bimolecular separation. The conventional approaches using binary mixtures of inorganic precursors and templates are problematic with inevitable catastrophic cracks or failure, because the thermal treatment step at the end of the process always induces severe residual stress due to large volume shrinkage. Recently, some unique approaches have been reported for vertically aligned mesoporous silica thin films on substrates, which include nano-scale epitaxial growth on repatterned surfaces, electrochemically induced self-assembly on conductive surfaces, and magnetic field assisted orientation at the small scale. However, such complicated methods being researched are limited in practical applications on large areas under precedent conditions. To date, the development of an accommodating method to form the robust silica-based porous films with lateral orientation on large and ordinary substrates still remains a challenging issue.

Furthermore, various nanoporous materials have been used as catalytic supports. Typically, it is known that catalyst components are selectively supported into pores or on the inner surface of pores; it enables the prevention of cohesion between catalyst particles, and also significantly reduces detachment of catalyst particles from the support. Then, the durability of a catalytic system is expected to be robust in the proceeding catalytic reaction under various conditions. In particular, ultra-fine gold particles, very mobile and large surface energies, tend to sinter easily at an elevated temperature. The sintering cohesion is undesirable inasmuch as the catalytic activity of gold tends to fall off as its particle size increases. Thus, there is a need to develop methods of depositing and immobilizing gold nanoparticles on a suitable support in a uniformly dispersed state.

(Non-Patent Document 1) Innocenzi, P., Malfatti, L., Kidchob, T. & Falcaro, P. Order-Disorder in self-assembled mesostructured silica films: A concepts review. Chem. Mater. 21, 2555-2564 (2009).

(Non-Patent Document 2) Walcarius, A., Sibottier, E., Etienne, M. & Ghanbaja, J. Electrochemically assisted self-assembly of mesoporous silica thin films. Nature Mater. 6, 602-608 (2007).

(Non-Patent Document 3) Nagarajan, S. et al. An efficient route to mesoporous silica films with perpendicular nanochannels. Adv. Mater. 20, 246-251 (2008).

(Non-Patent Document 4) Richman, E. K., Brezesinski, T. & Tolbert, S. H. Vertically oriented hexagonal mesoporous films formed through nanometer-scale epitaxy. Nature Mater. 7, 712-717 (2008).

(Non-Patent Document 5) Yamaguchi, A. et al. Self-assembly of a silica-surfactant nanocomposite in a porous alumina membrane. Nature Mater. 3, 337-341 (2004).

(Non-Patent Document 6) Freer, E. M. et al. Oriented mesoporous organosilicate thin films. Nano Lett. 5, 2014-2018 (2005).

(Non-Patent Document 7) Xu, J. et al. Fabrication of silicon oxide nanodots with an areal density beyond 1 teradots inch-2. Adv. Mater. 23, 5755-5761 (2011).

(Non-Patent Document 8) Zhao, D. et al. Continuous mesoporous silica films with highly ordered large pore structures. Adv. Mater. 10, 1380-1385 (1998).

(Non-Patent Document 9) Park, S., Kim, B., Wang, J. Y. & Russell, T. P. Fabrication of highly ordered silicon oxide dots and stripes from block copolymer thin films. Adv. Mater. 20, 681-685 (2008).

(Non-Patent Document 10) Tolbert, S. H., Firouzi, A., Stucky, G. D. & Chmelka, B. F. Magnetic field alignment of ordered silicate-surfactant composites and mesoporous silica. Science 278, 264-268 (1997).

(Non-Patent Document 11) Yamauchi, Y. et al. Orientation of mesochannels in continuous mesoporous silica films by a high magnetic field. J. Mater. Chem. 15, 1137-1140 (2005).

(Non-Patent Document 12) Lu, Q., Gao, F., Komarneni, S. & Mallouk, T. E. Ordered SBA-15 nanorod arrays inside a porous alumina membrane. J. Am. Chem. Soc. 126, 8650-8651 (2004).

(Non-Patent Document 13) Wang, M. et al. Gold nanoparticles confined in the interconnected carbon foams with high temperature stability. Chem. Commun. 48, 10404-10406 (2012).

(Non-Patent Document 14) Brinker, C. J. & Dunphy, D. R. Morphological control of surfactant-templated metal oxide films. Curr. Opin. Colloid Interface Sci. 11, 126-132 (2006).

(Non-Patent Document 15) Nghiem, Q. D., Kim, D. J. & Kim, D. P. Synthesis of inorganic-organic diblock copolymers as a precursor of ordered mesoporous SiCN ceramic. Adv. Mater. 19, 2351-2354 (2007).

(Non-Patent Document 16) Nghiem, Q. D., Nguyen, C. T. & Kim, D.-P. Controlled/living radical polymerization of vinylcyclicsilazane by RAFT process and their block copolymers. Journal of Polymer Science Part A: Polymer Chemistry 46, 4594-4601 (2008).

(Non-Patent Document 17) Nguyen, C. T., Hoang, P. H., Perumal, J. & Kim, D.-P. An inorganic-organic diblock (Non-Patent Document 18) Lai, J. T., Filla, D. & Shea, R. Functional polymers from novel carboxyl-terminated trithiocarbonates as highly efficient RAFT Agents. Macromolecules 35, 6754-6756 (2002).

(Non-Patent Document 19) Ryu, J.-H. et al. Highly ordered gold nanotubes using thiols at a cleavable Block copolymer Interface. J. Am. Chem. Soc. 131, 9870-9871 (2009).

(Non-Patent Document 20) Leibler, L. Theory of microphase separation in block copolymers. Macromolecules 13, 1602-1617 (1980).

(Non-Patent Document 21) Matsen, M. W. & Bates, F. S. Unifying weak- and strong-segregation block copolymer theories. Macromolecules 29, 1091-1098 (1996).

(Non-Patent Document 22) Bang, J. et al. Effect of humidity on the ordering of PEO-based copolymer thin films. Macromolecules 40, 7019-7025 (2007).

(Non-Patent Document 23) Park, S. et al. Macroscopic 10-terabitquare-inch arrays from block copolymers with lateral order. Science 323, 1030-1033 (2009).

(Non-Patent Document 24) Thurn-Albrecht, T. et al. Ultrahigh-density nanowire arrays grown in self-assembled diblock copolymer templates. Science 290, 2126-2129 (2000).

(Non-Patent Document 25) Yurt, S., Anyanwu, U. K., Scheintaub, J. R., Coughlin, E. B. & Venkataraman, D. Scission of diblock copolymers into their constituent blocks. Macromolecules 39, 1670-1672 (2006).

(Non-Patent Document 26) Guo, F., Andreasen, J. W., Vigild, M. E. & Ndoni, S. Influence of 1,2-PB matrix cross-linking on structure and properties of selectively etched 1,2-PB-b-PDMS block copolymers. Macromolecules 40, 3669-3675 (2007).

(Non-Patent Document 27) Klaikherd, A., Ghosh, S. & Thayumanavan, S. A Facile method for the synthesis of cleavable block copolymers from ATRP-based homopolymers. Macromolecules 40, 8518-8520 (2007).

(Non-Patent Document 28) Kubo, T. & Kozuka, H. Conversion of perhydropolysilazane-to-silica thin films by exposure to vapor from aqueous ammonia at room temperature. Journal of the Ceramic Society of Japan 114, 517-523 (2006).

(Non-Patent Document 29) Li, M. & Kim, D. P. Silicate glass coated microchannels through a phase conversion process for glass-like electrokinetic performance. Lab Chip. 11, 1126-1131 (2011).

(Non-Patent Document 30) Fang, Q., Kim, D.-P., Li, X., Yoon, T.-H. & Li, Y. Facile fabrication of a rigid and chemically resistant micromixer system from photocurable inorganic polymer by static liquid photolithography (SLP). Lab Chip. 11, 2779-2784 (2011).

(Non-Patent Document 31) Fang, Q., Li, X., Tuan, A. P., Perumal, J. & Kim, D.-P. Direct pattern transfer using an inorganic polymer-derived silicate etch mask. J. Mater. Chem. 21, 4657-4662 (2011).

(Non-Patent Document 32) Park, S. et al. Non-sticky silicate replica mold by phase conversion approach for nanoimprint lithography applications. J. Mater. Chem. 20, 9962-9967 (2010).

(Non-Patent Document 33) Rodriguez-Baeza, M., Neira C, A. & Aguilera J, C. Synthesis of poly [(methylsiloxane)-co-(dimethylsilazane)] copolymers as precursors of ceramic materials. J. Polymer bulletin 50, 25-32 (2003).

(Non-Patent Document 34) Choi, D.-H. et al. Use of a columnar metal thin film as a nanosieve with sub-10 nm pores. Adv. Mater. 24, 4408-4413 (2012).

(Non-Patent Document 35) Lee, J., Park, J. C. & Song, H. A Nanoreactor framework of a Au@SiO2 yolk/shell structure for catalytic reduction of p-nitrophenol. Adv. Mater. 20, 1523-1528 (2008).

(Non-Patent Document 36) Ge, J., Zhang, Q., Zhang, T. & Yin, Y. Coreatellite nanocomposite catalysts protected by a porous silica Shell: controllable reactivity, high stability, and magnetic recyclability. Angew. Chem. Int. Ed. 47, 8924-8928 (2008).

(Non-Patent Document 37) Patil, N. S., Jha, R., Uphade, B. S., Bhargava, S. K. & Choudhary, V. R. Epoxidation of styrene by anhydrous t-butyl hydroperoxide over gold supported on Al2O3, Ga2O3, In2O3 and Tl2O3. Appl. Catal. A: General 275, 87-93 (2004).

(Non-Patent Document 38) Lambert, R. M., Williams, F. J., Cropley, R. L. & Palermo, A. Heterogeneous alkene epoxidation: past, present and future. J. Mol. Catal. A: Chem. 228, 27-33 (2005).

(Non-Patent Document 39) Hashmi, A. S. K. & Hutchings, G. J. Gold catalysis. Angew. Chem. Int. Ed. 45, 7896-7936 (2006).

(Non-Patent Document 40) Della Pina, C., Falletta, E., Prati, L. & Rossi, M. Selective oxidation using gold. Chem. Soc. Rev. 37, 2077-2095 (2008).

(Non-Patent Document 41) Hughes, M. D. et al. Tunable gold catalysts for selective hydrocarbon oxidation under mild conditions. Nature 437, 1132-1135 (2005).

(Non-Patent Document 42) Ojeda, M. & Iglesia, E. Formic Acid dehydrogenation on Au-based catalysts at near-ambient temperatures. Angew. Chem. Int. Ed. 48, 4800-4803 (2009).

(Non-Patent Document 43) Du, X. L. et al. Hydrogen-independent reductive transformation of carbohydrate biomass into valerolactone and pyrrolidone derivatives with supported gold catalysts. Angew. Chem. Int. Ed. 50, 7815-7819 (2011).

(Non-Patent Document 44) Corma, A. & Serna, P. Chemoselective hydrogenation of nitro compounds with supported gold catalysts. Science 313, 332-334 (2006).

DISCLOSURE

Technical Problem

Accordingly, the present invention has been made keeping in mind the above problems encountered in the related art, and an object of the present invention is to provide a novel method of manufacturing a vertically aligned mesoporous thin film.

Another object of the present invention is to provide a novel functional thin film in which mesopores are vertically aligned side by side.

Still another object of the present invention is to provide a microreactor and a catalyst in which mesopores are vertically aligned side by side.

Still another object of the present invention is to provide a method of preparing a catalyst in which mesopores are vertically aligned side by side.

Still another object of the present invention is to provide novel use of a thin film in which mesopores are vertically aligned side by side.

Still another object of the present invention is to provide a vertically aligned mesoporous silicate film with a single polymer structure, and a method of manufacturing the same.

Still another object of the present invention is to provide a film in which a metal is site-selectively deposited on a vertically aligned mesoporous silicate film, and a method of manufacturing the same.

Still another object of the present invention is to provide use of, as a catalyst, a film in which a metal is site-selectively deposited on a vertically aligned mesoporous silicate film.

Still another object of the present invention is to provide a microreactor using a film in which a metal is site-selectively deposited on a vertically aligned mesoporous silicate film.

Technical Solution

In order to accomplish the above objects, the present invention provides a method of manufacturing a mesoporous ceramic thin film, comprising self-assembling a block copolymer including at least one inorganic block which is linked by a disulfide bridge and is converted into a ceramic, cleaving the disulfide bridge to remove a portion of the block copolymer other than the inorganic block, and converting the inorganic block into a ceramic phase.

Although not being theoretically limited, the disulfide bridge enables the formation of —SH group in the mesopores upon cleaving, and the —SH group of the mesopores is coupled with metal nanoparticles to prevent efficiency of the metal nanoparticles from decreasing due to sintering at high temperature.

In the present invention, examples of the inorganic block which may be converted into a ceramic include, as disclosed in Korean Patent Application No. 2010-115529 which is hereby incorporated by reference in its entirety into this application, a polycarbosilane block, a polysilazane block, a polyborazine block, a polysilsessiloxane block, an allylperhydropolycarbosilane block, a polyvinylsilazane block, a polyvinylcyclicsilazane block, polysilane (—($R_2$Si)n-), polysiloxane (—($R_2$SiO)n-), aluminum amide (=AlNR-)n), poly titanium imide (=Ti($NR_2$)—), etc., wherein R is C1~8 alkyl.

In the present invention, particularly useful as the inorganic block which may be converted into a ceramic phase is a polyvinylcyclicsilazane (PVCSZ) block which may be converted into a siliceous phase at a high conversion at low temperature via a process such as hydrolysis or the like.

In the present invention, the block copolymer may be an organic-inorganic diblock copolymer which is linked by the disulfide bridge able to generate phase separation via self-assembly. The organic block may be used without limitation so long as it is phase separated in the form of mesopores via self-assembly, and examples thereof may include a polyethyleneoxide (PEO) block, a polystyrene block, a polystyrene block wherein hydrogen of a benzene ring is substituted with —$SO_3$H, polymethylmethacrylate, etc. Preferably useful is a polyethyleneoxide block.

In a preferred embodiment of the present invention, the block copolymer is a polyethyleneoxide-ss-polyvinylcyclicsilazane (PEO-ss-PVCSZ) block copolymer. In a preferred embodiment of the present invention, the PEO-ss-PVCSZ block copolymer has a volume fraction of 0.6~0.8, preferably 0.65~0.75, and more preferably about 0.7 so as to form a hexagonal structure wherein the organic block is vertically arranged on a substrate. The organic block has a molecular weight (Mn) of about 15~20 kg/mol with a polydispersity of about 1.1~1.3, and the inorganic block has a Mn of 12~13 kg/mol with a polydispersity of about 1.2.

In an embodiment of the present invention, the block copolymer may be annealed with a solvent at room temperature so as to improve the degree of phase separation. The self-assembled thin film may be stabilized or cured before removal of the organic block, and preferably the inorganic block is selectively stabilized or cured. UV may be applied so as to cure polyvinylcyclicsilazane.

In the present invention, the disulfide bridge may be cleaved using a known process to remove PEO, and for example, a dithiothreitol (DTT) solution may be used.

In the present invention, converting the inorganic block into the ceramic phase may be performed at high temperature or low temperature. Preferably, in the case of a polyvinylcyclicsilazane thin film, it may be converted into a silicate phase at low temperature using hydrolysis.

An aspect of the present invention provides a method of manufacturing a mesoporous thin film, comprising self-assembling a block copolymer including at least one inorganic block which is linked by a disulfide bridge and is converted into a ceramic and an organic block so that vertical cylinders 2~50 nm thick are formed by the organic block, and cleaving the disulfide bridge to remove the organic block, thus forming mesopores.

In addition, an aspect of the present invention provides a method of manufacturing a mesoporous ceramic thin film, comprising preparing an inorganic polymer thin film in which mesopores are vertically aligned side by side and a thiol group is formed in the mesopores, and converting the inorganic polymer thin film into a ceramic phase.

In the present invention, the inorganic polymer thin film is a thin film in which the —SH functional group is formed in the mesopores and which is may be converted into a ceramic phase, and examples thereof may include thin films of polycarbosilane, polysilazane, polyborazine, polysilsessiloxane, allylperhydropolycarbosilane, polyvinylsilazane, polyvinylcyclicsilazane, polysilane (—($R_2$Si)n-), polysiloxane (—($R_2$SiO)n-), aluminum amide (=AlNR-)n), and poly titanium imide (=Ti($NR_2$)—).

In addition, an aspect of the present invention provides a mesoporous thin film in which mesopores having a thiol group therein are vertically aligned side by side.

In the present invention, the thin film may be formed to have a large area of 4 $cm^2$ or more on a non-conductive substrate such as a silicon wafer, and preferably has a thickness of about 30 nm or less so as to be provided in the form of vertical cylinders aligned side by side via self-assembly.

In addition, an aspect of the present invention provides a mesoporous thin film in which a metal is supported on the inside of mesopores vertically aligned side by side.

In the present invention, the mesoporous thin film is a silicate thin film, and the metal is in the form of particles having a size of 1~10 nm and is supported on the inside of the mesopores. Although not being theoretically limited, a metal is supported via the reaction with the —SH group and is thus stable to sintering due to flow at high temperature.

In addition, an aspect of the present invention provides a reactive thin film in which a metal active component is supported on a ceramic thin film having mesopores vertically aligned side by side. In the present invention, the reactive thin film may be effectively utilized in a microchannel fluid reactor, etc., and prevents cohesion of the supported metal due to sintering, thus increasing reaction efficiency.

In addition, an aspect of the present invention provides a microchannel reactor, comprising a substrate, a catalytic reaction active layer which is formed on at least one surface of the substrate and in which an active component is supported on a ceramic thin film having mesopores vertically aligned side by side, and a microchannel formed on the catalytic reaction active layer.

In one embodiment of the present invention, the catalytic reaction is epoxidation of an olefin using gold. In another embodiment of the present invention, the catalytic reaction is hydrogenation of an acid compound using gold. In still another embodiment of the present invention, the catalytic reaction is selective hydration of an aromatic nitrile compound into an amide compound using silver. In yet another embodiment of the present invention, the catalytic reaction is a Suzuki coupling reaction using palladium.

In addition, an aspect of the present invention provides a method of manufacturing a catalytic reactive thin film, comprising supporting a metal active component on a ceramic thin film in which mesopores having a —SH group therein are vertically aligned side by side.

In addition, an aspect of the present invention provides an organic-inorganic diblock copolymer linked by a disulfide bridge (-ss-) and a method of preparing the same. The organic-inorganic diblock copolymer linked by the disulfide bridge (-ss-) is a polyethyleneoxide-ss-polyvinylcyclicsilazane block copolymer.

Advantageous Effects

According to the present invention, a vertically aligned and thiol functionalized mesoporous silicate thin film and a method of manufacturing the same via hydrolysis using a new organic-inorganic diblock copolymer at room temperature, are provided.

A PEO-ss-PVCSZ BCP linked by a disulfide, rather than conventional binary mixtures, is used as a single precursor to prepare a self-assembled and vertically aligned mesoporous silicate with —SH functionality via simple solvent annealing and cleavage processes.

The self-assembled BCP disclosed herein can be formed on conductive and non-conductive substrates in large areas, with the chemical and thermal stability of the hexagonal and vertical morphology, and the pore diameter and the distance (d-spacing) between the pores can be changed by adjusting the molecular weight of PEO and PVCSZ. The hydrolyzed silicate structure is stable up to 250° C. under air as well as 700° C. under nitrogen flow without any major structural deformation, and this thermally stable mesostructure can also be utilized as nano-sieves and nano-templates.

Also, the thin film of the present invention is proven by selectively immobilizing or decorating metal particles inside the nanopores, and can be applied in the field of heterogeneous catalysis using a microchannel chemical system.

The functionalized silicate thin film having a variety of applications according to the present invention can also be useful in biosensors and biomolecular separation with nanowells on conductive substrates, adjustment of dielectric constant, and control of material transfer through the film.

DESCRIPTION OF DRAWINGS

FIGS. 2A to 2F illustrate grazing incidence small-angle x-ray scattering (GISAXS) patterns, height mode atomic force microscopy (AFM) images and corresponding line profiles, wherein FIGS. 2A and 2D show PEO-ss-PVCSZ self-assembled via solvent annealing for 5 hr, FIGS. 2B and 2E show thiol functionalized mesoporous PVCSZ polymer thin films after removal of PEO block via DTT treatment for 10 hr, and FIGS. 2C and 2F show thiol functionalized mesoporous silicate thin films after ammonia vapor treatment for 5 hr, the insets being the AFM images after corresponding Fourier transformation;

MODE FOR INVENTION

Figure 1:
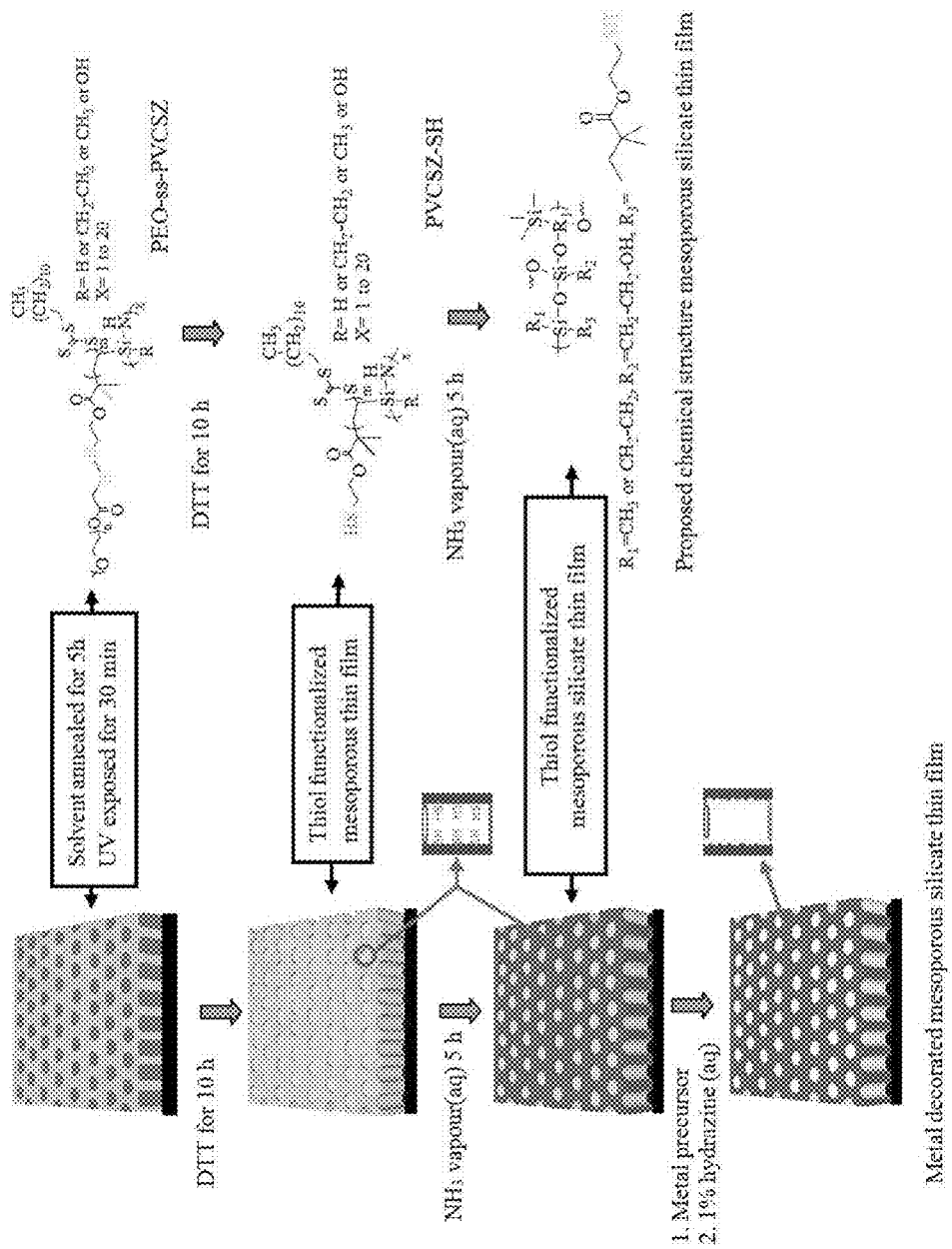
FIG. 1 schematically illustrates the manufacture of a selectively metal decorated and vertically aligned mesoporous silicate thin film using a PEO-ss-PVCSZ block copolymer, including chemical conversion of a polymer into a silicate ceramic phase.

A better understanding of the present invention may be obtained through the following examples which are set forth to illustrate, but are not to be construed as the limit of the present invention.

Manufacture of Thin Film

A vertically aligned mesoporous silicate thin film having high thermal and chemical resistance was manufactured using a single precursor on a large-area Si wafer (2 cm×3 cm). As the single precursor, a precisely designed organic-inorganic block copolymer (BCP) polyethyleneoxide-ss-polyvinylcyclicsilazane (PEO-ss-PVCSZ) with a disulfide bridge that was chemically cleavable was newly synthesized. Using such a precursor, solvent annealing, self-assembling, block cleaving treatment, and then hydrolysis conversion of a polymer into a siliceous phase at room temperature were carried out, thus directly forming a mesostructure on the substrate. The —SH functionalized inner walls of the mesopores of the mesostructure were decorated with any metal such as gold, palladium and silver using a site-selective process.

Even when the manufactured mesostructure was thermally and chemically exposed under severe conditions, it exhibited durability as a heterogeneous catalyst in a microfluidic chemical reaction, and was usable in control of material transfer through the film, adjustment of dielectric constant, biochemical separation, and sensors.

A block (polyvinylcyclicsilazane (PVCSZ)) having a silicon-nitrogen backbone was adopted as the precursor of a silicate material, and converted into silicon carbonitride ($SiC_xN_y$) or a silicate-based ceramic phase at a high ceramic conversion under various treatment conditions such as high temperature pyrolysis or room temperature hydrolysis.

PEO-ss-PVCSZ was synthesized via a reversible addition fragmentation chain transfer (RAFT) process using a PEO macroinitiator having a disulfide bond (Scheme 1).

The PEO-based macroinitiator (Mn: 5.0 kg/mol) was synthesized as in cited references 18 and 19 which are incorporated herein. Polymerization of PVCSZ using the PEO macroinitiator resulted in an organic-inorganic BCP having a controlled molecular weight (Mn: 17.6 kg/mol) and a polydispersity of 1.18 (measured by GPC), and the volume fraction of the inorganic block (Mn: 12.6 kg/mol PDI: 1.2) was controlled to about 0.7 to form a hexagonal structure.

$^1$H NMR spectrum was used to identify the detailed chemical structure of the synthesized PEO-ss-PVCSZ. The signals at $\delta$=5.6~6.2 ppm and $\delta$=4.3~4.6 ppm corresponded to a vinyl group and Si—H of the PVCSZ block, respectively, and the peak at $\delta$=3.4~3.7 ppm corresponded to the proton group of the PEO block. Compared to initial PVCSZ, the integral ratio (vinyl/Si—H) of the PEO-ss-PVCSZ BCP was decreased from 0.73 to 0.50.

In order to identify micro phase separation of the synthesized BCP, a film 30 nm thick was synthesized on a silicon substrate using a BCP solution in 0.4% benzene. The film was annealed for 4 hr in a saturated benzene vapor atmosphere and in a water vapor atmosphere for additional 1 hr.

The self-assembled BCP thin film was exposed to water vapor or a relative humidity (RH) of 65% or more to efficiently orient the hydrophilic PEO block, thus improving hexagonal packing. The self-assembled thin film was exposed to UV for 30 min, so that the vinyl group that was not reacted in the PVCSZ block was crosslinked.

In order to measure morphology of the nanostructured film after solvent annealing, GISAXS (Grazing incidence small-angle x-ray scattering) was used.

The organization of the cylindrical PEO microdomains oriented in the 2D hexagonal structure represented the presence of two peculiar diffraction rods as illustrated in FIGS. 2A to 2F. An elongation in the vertical direction showed that the cylindrical microdomains were oriented perpendicularly to the surface with a similar trend on the entire irradiated surface.

Figure 2:
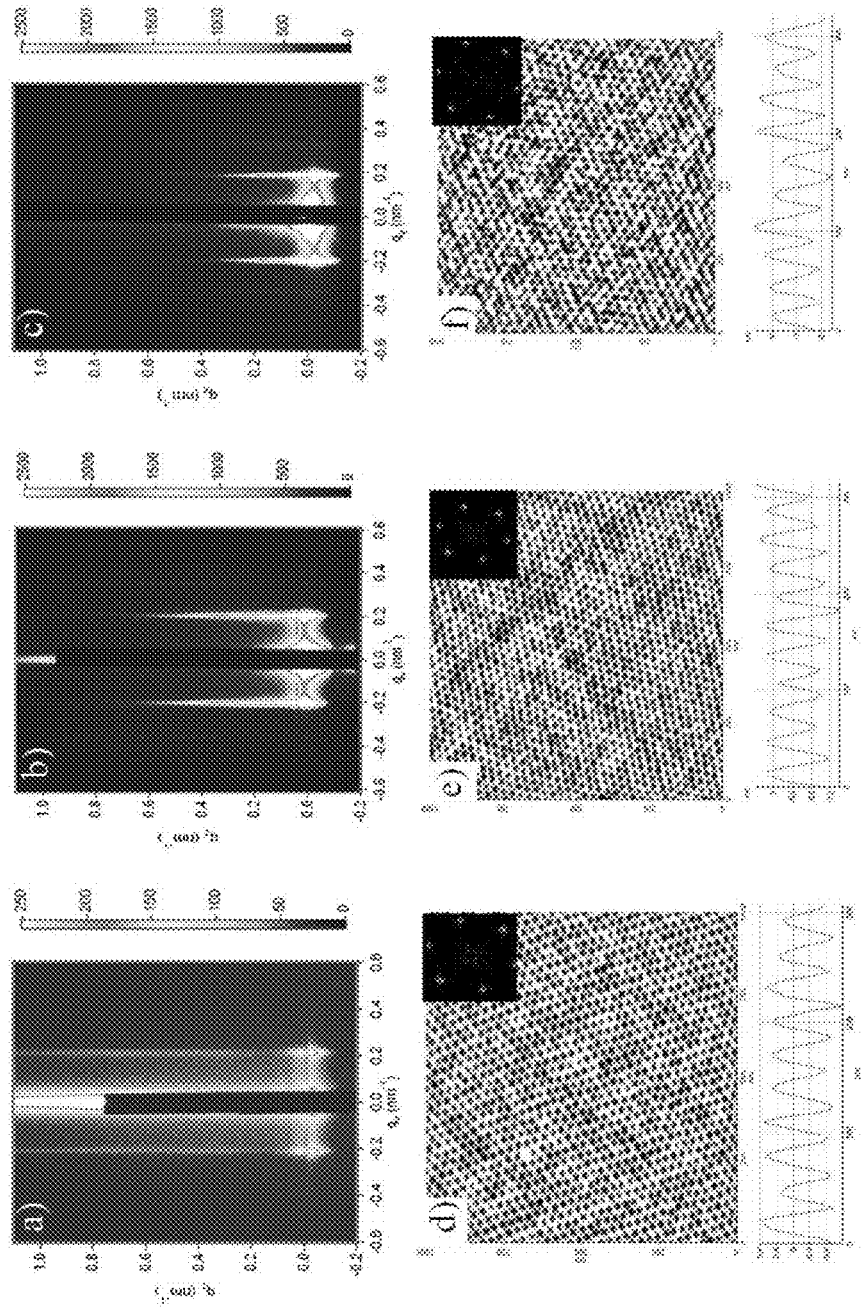

The morphology of the self-assembled surface was observed using an atomic force microscope (AFM). The results are shown in FIG. 2D. In agreement with the results of GISAXS, the corresponding Fourier transformation of the AFM image in the inset represented the orientation in a wide range and the features of hexagonal packing.

Figure 3:
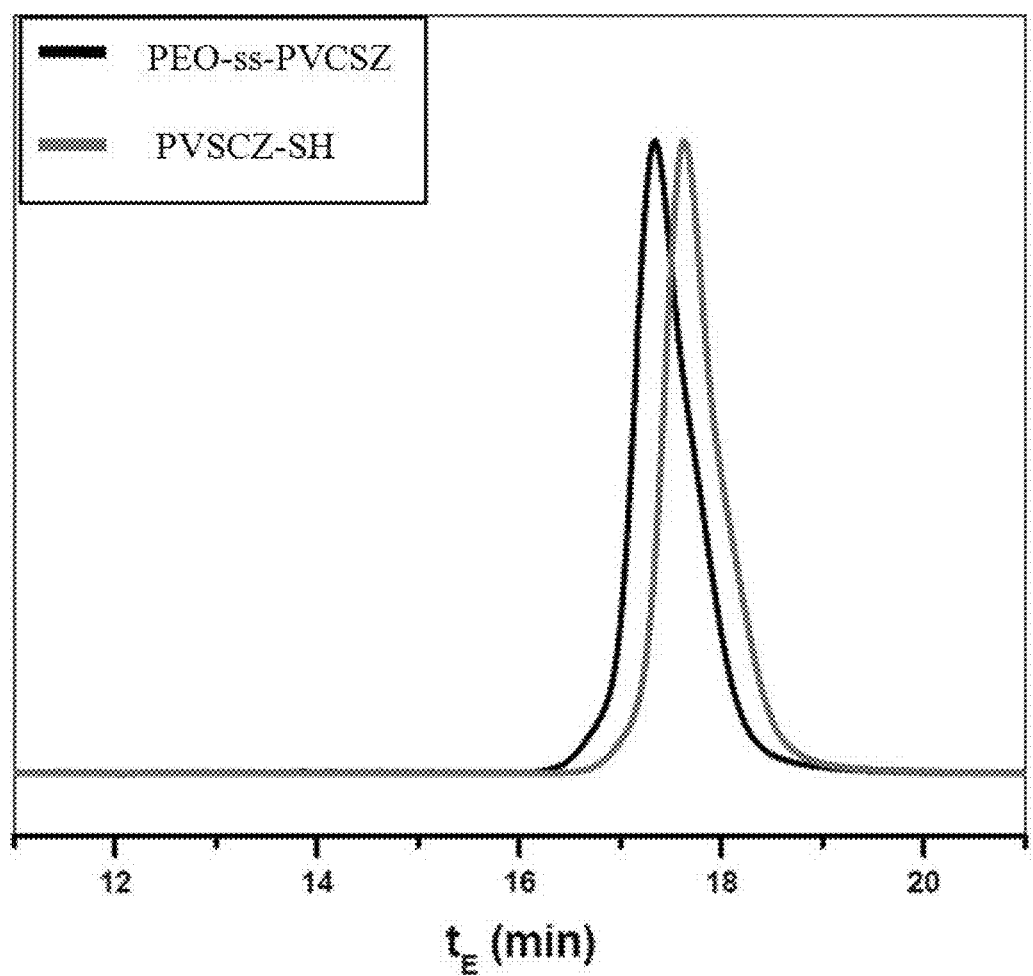
FIG. 3 illustrates a gel permeation chromatography (GPC) chromatogram of as-synthesized PEO-ss-PVCSZ block copolymer and PVCSZ-SH after removal of PEO block via DTT treatment.
Figure 4:
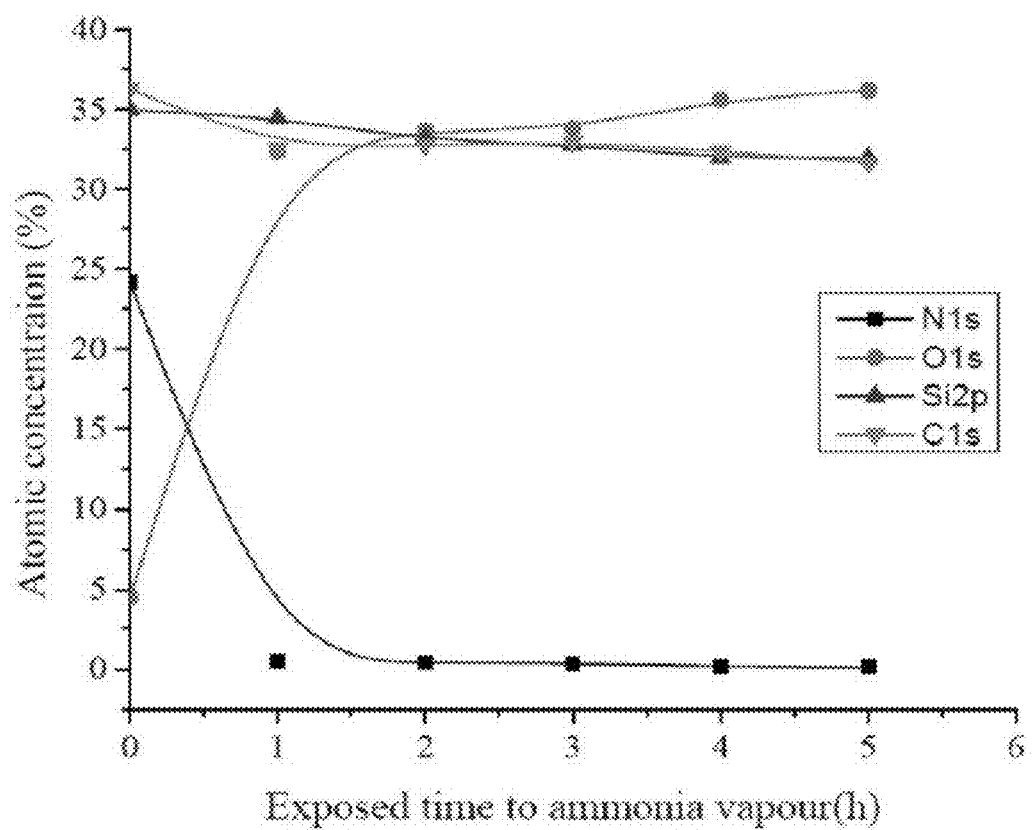
FIG. 4 illustrates the results of measurement of surface components using X-ray photoelectron spectroscopy (XPS) after chemical conversion of a polymer to a silicate phase using hydrolysis at different ammonia exposure times.
Figure 5:
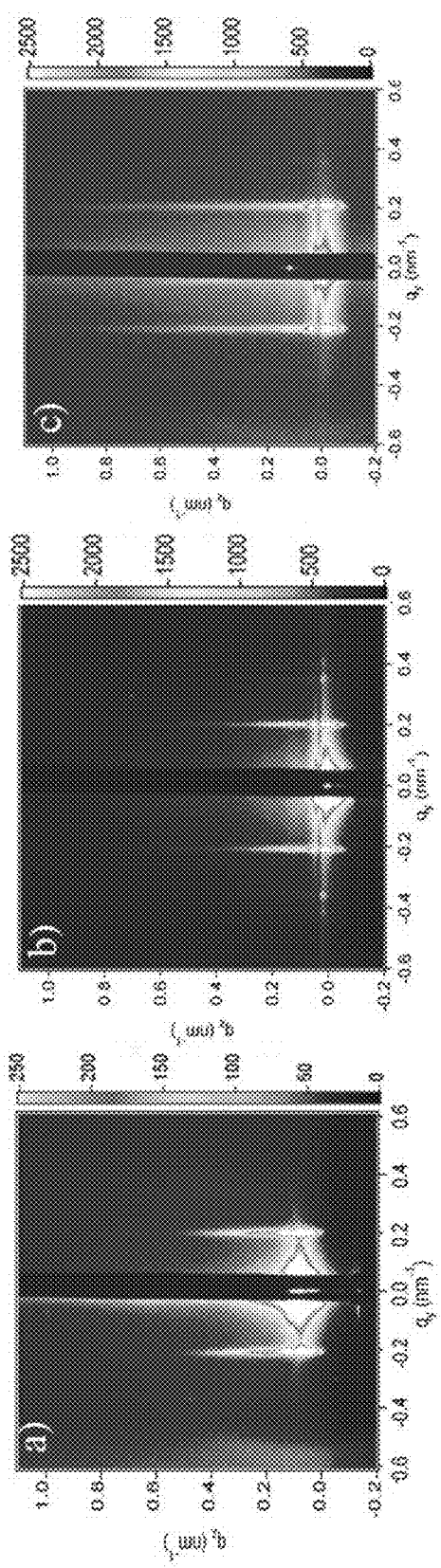
FIGS. 5A, 5B and 5C illustrate GISAXS patterns of silver (Ag) decorated, palladium (Pd) decorated and gold (Au) decorated, respectively, after immobilization of metal into the mesoporous silicate thin film from the PEO-ss-PVCSZ block copolymer.
Figure 6:
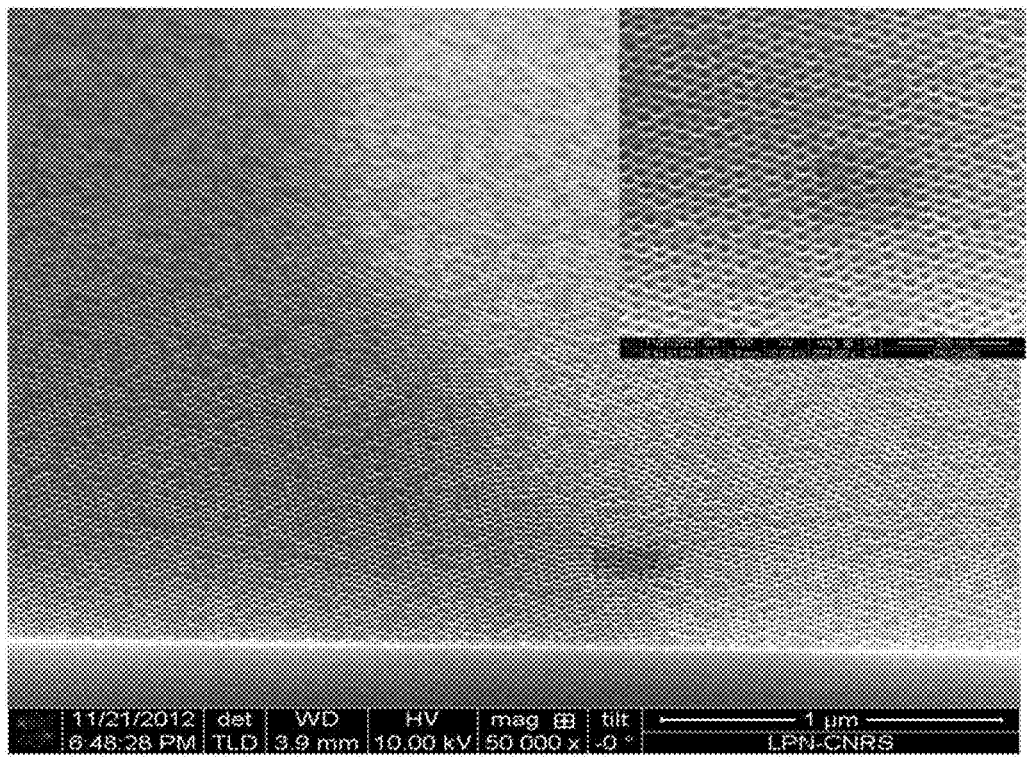
FIG. 6 illustrates high-resolution scanning electron microscopy (SEM) images of the mesoporous silicate thin film after PEO etching and hydrolysis of the PEO-ss-PVCSZ block copolymer (inset scale bar 200 nm)
Figure 7:
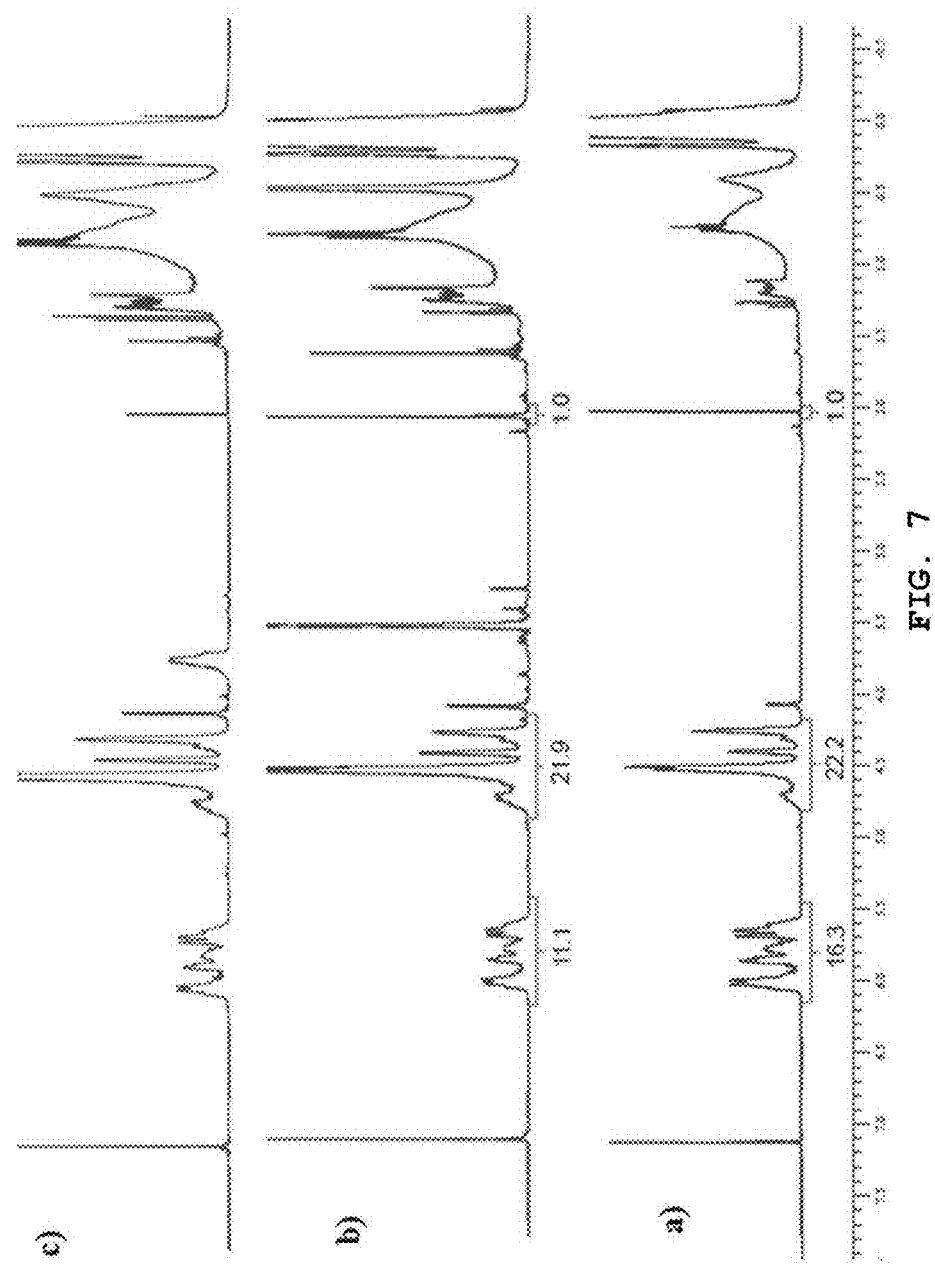
FIGS. 7A, 7B and 7C illustrate $^1$H NMR spectra of a PVCSZ oligomer, a PEO-ss-PVCSZ diblock copolymer and PVCSZ-SH after DTT treatment, respectively.
Figure 8:
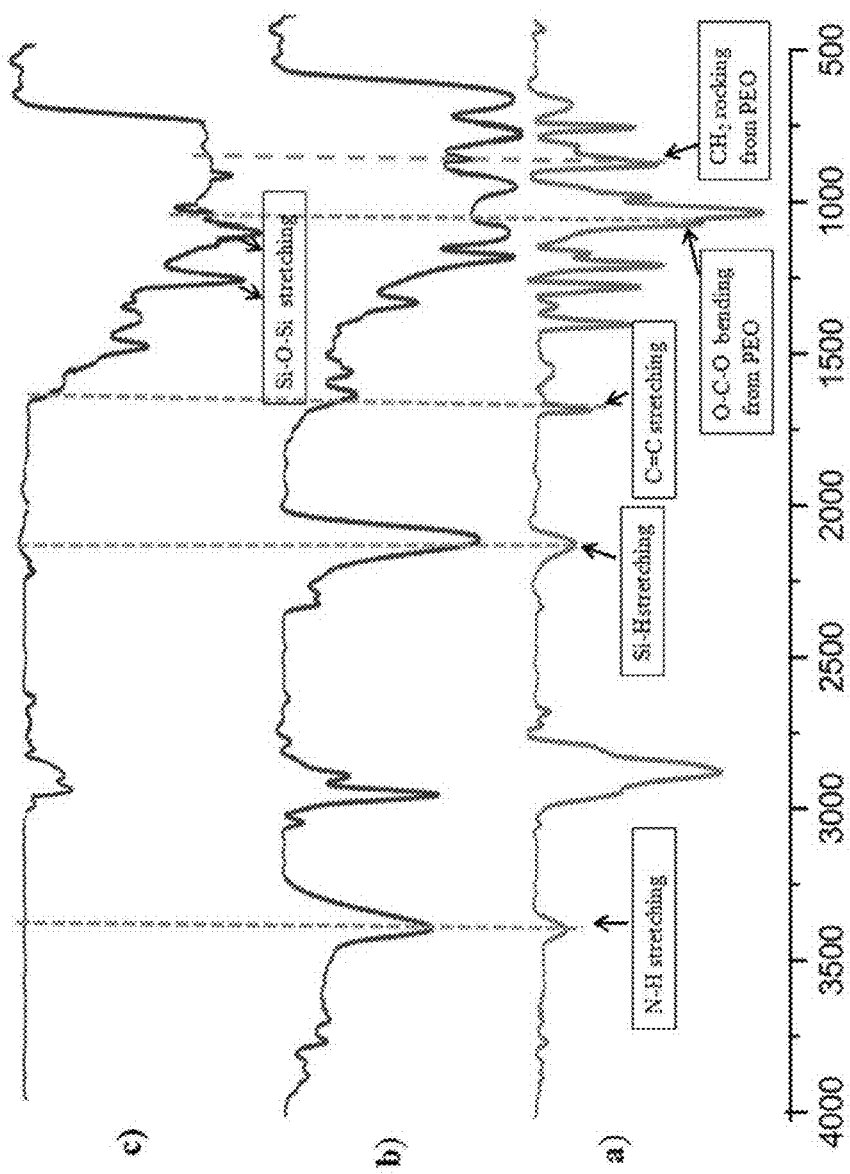
FIGS. 8A, 8B and 8C illustrate FT-IR spectra of PEO-ss-PVCSZ, PVCSZ-SH after DTT treatment and PVSCZ-SH after ammonia treatment, respectively.
Figure 9:
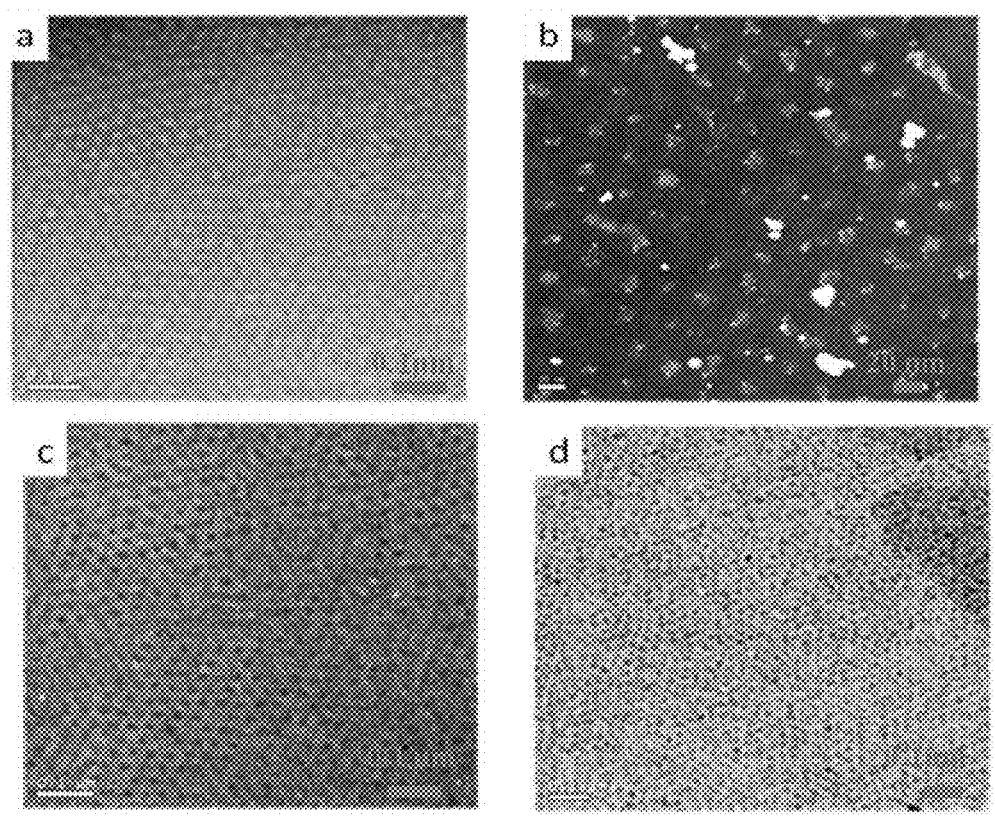
FIGS. 9A to 9D illustrate transmission electron microscopy (TEM) images of a mesoporous PVCSZ-SH film after cleavage of the PEO block (FIG. 9A), and metal decorated nanoporous silicate films using gold (FIG. 9B), silver (FIG. 9C), and palladium (FIG. 9D)
Figure 10:
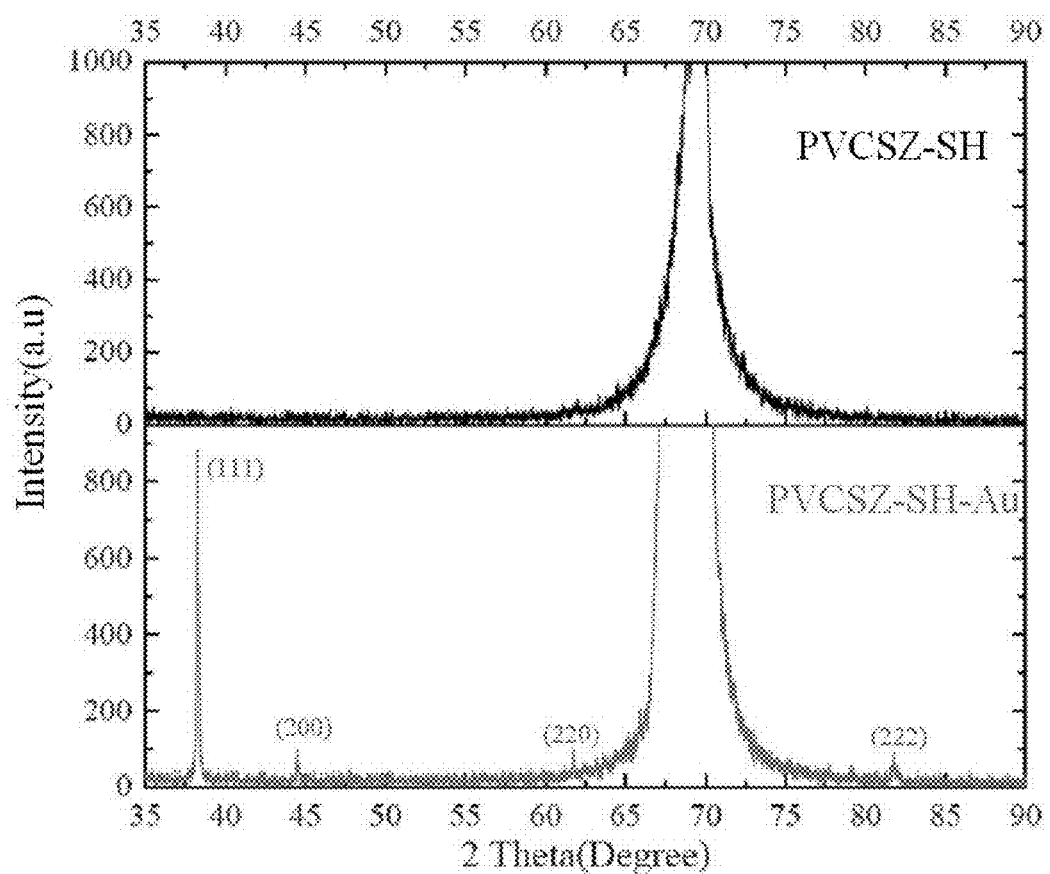
FIG. 10 illustrates X-ray diffraction (XRD) patterns of a gold decorated nanoporous silicate film (PVCSZ-SH—Au) and a metal unloaded silicate film (PVCSZ-SH) on a silicon wafer.
Figure 11:
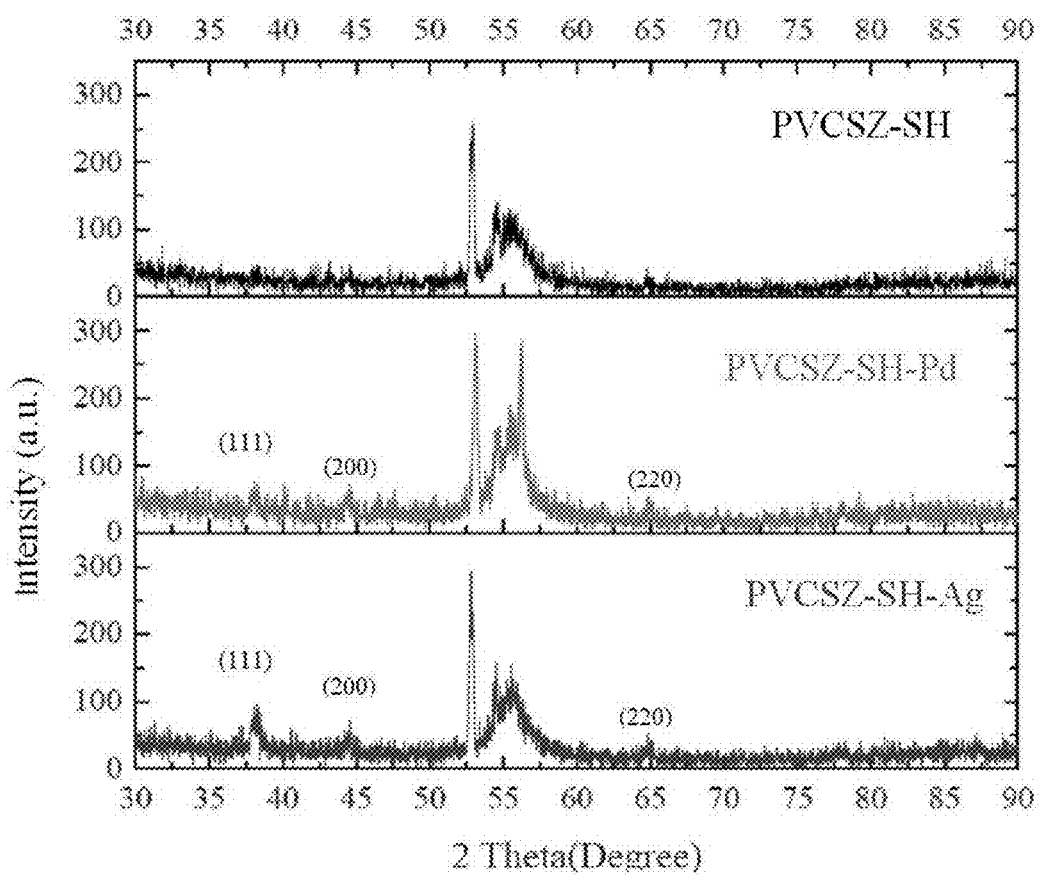
FIG. 11 illustrates XRD patterns of a silver decorated nanoporous silicate film (PVCSZ-SH—Ag), a palladium decorated silicate film (PVCSZ-SH—Pd) and a silicate film (PVCSZ-SH) having no metal, on the silicon wafer.
Figure 12:
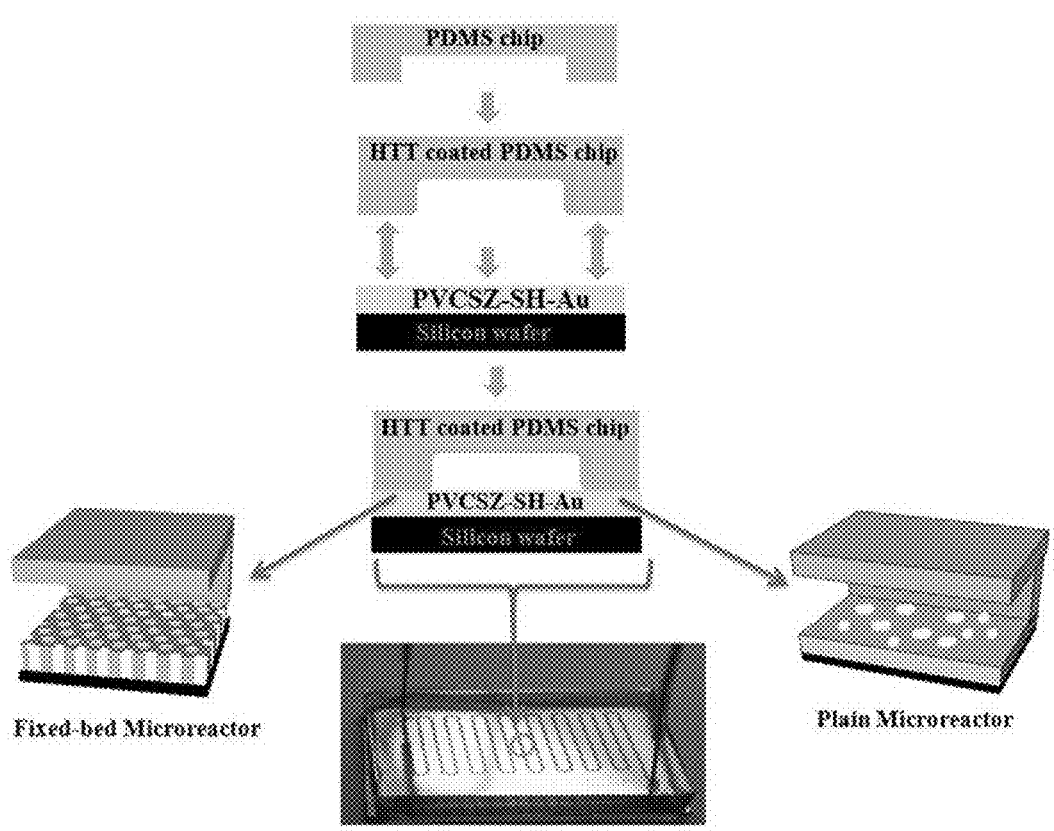
FIG. 12 schematically illustrates the manufacture of a fixed-bed microreactor having Au bonded thereto on the mesoporous silicate thin film, and a plain microreactor.
Figure 13:
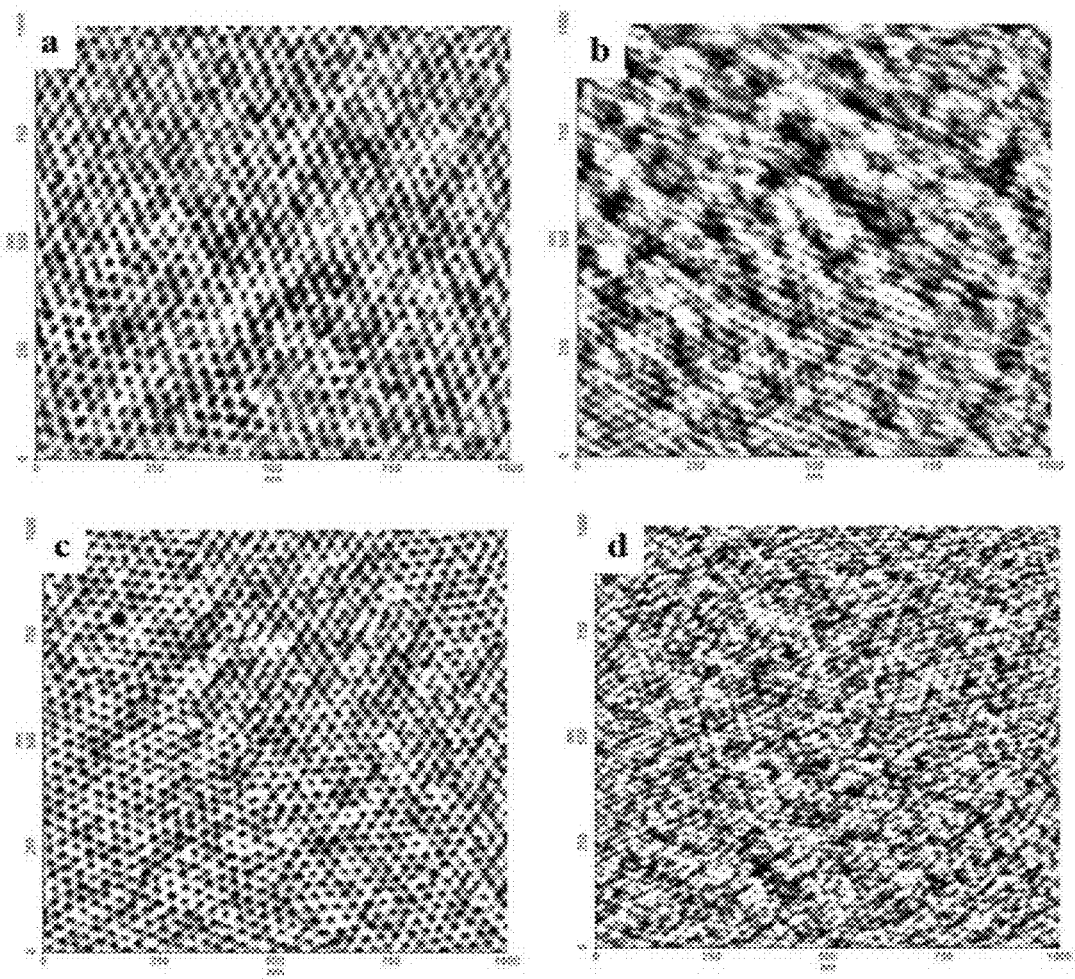
FIGS. 13A to 13D illustrate AFM images of vertically aligned mesoporous silicate thin films after exposure under various thermal conditions, that is, 700° C. for 1 hr under nitrogen flow (FIG. 13A), 800° C. for 1 hr under nitrogen flow (FIG. 13B), 250° C. for 1 hr under air (FIG. 13C), and 300° C. for hr under air (FIG. 13D)
Figure 14:
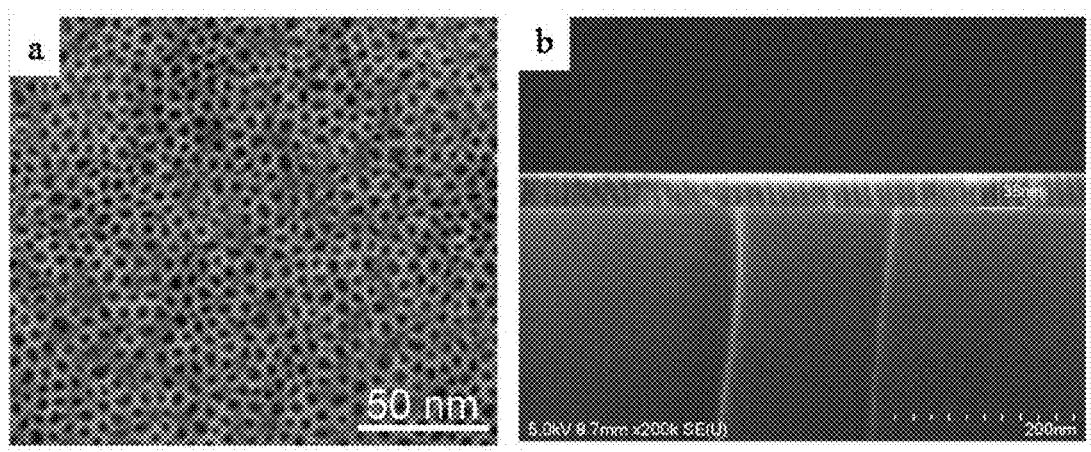
FIGS. 14A and 14B illustrate a top view and a cross-sectional view, respectively, of a high-resolution SEM image of PS-b-PVCSZ having no disulfide bridge after pyrolysis at 900° C. under nitrogen flow.
Figure 15:
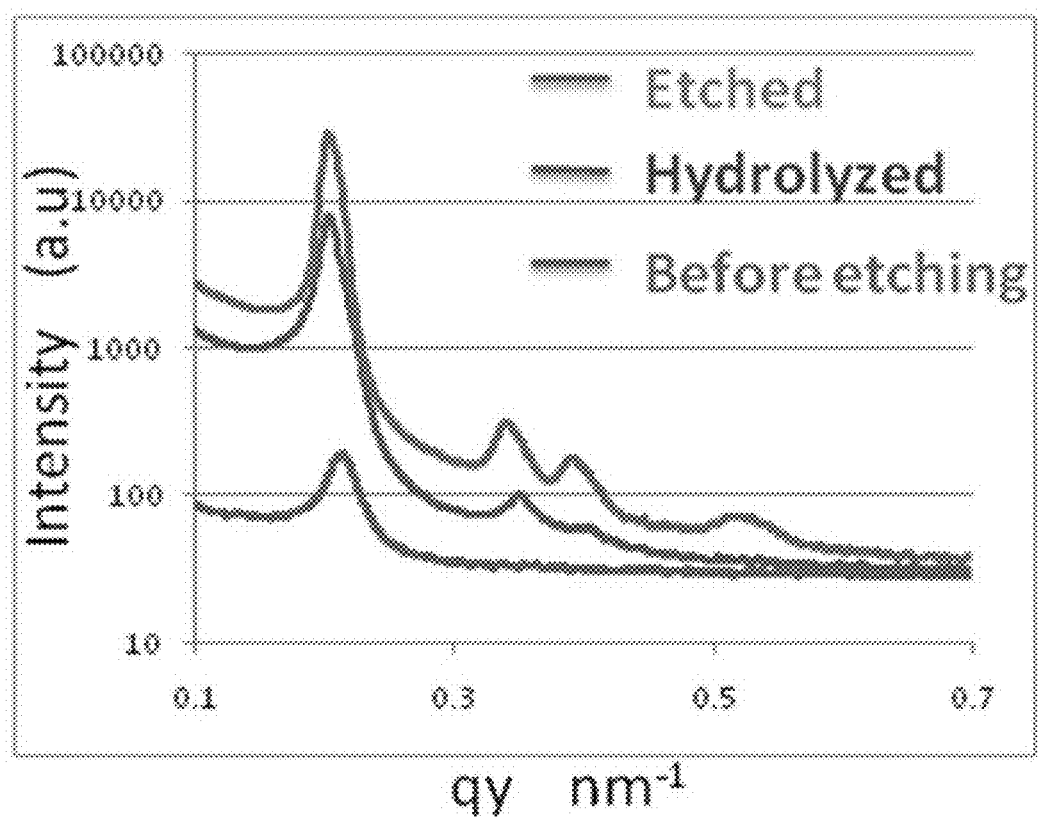
FIG. 15 illustrates the GISAXS intensity patterns of the mesoporous thin films at a variety of stages: self-assembled PEO-ss-PVCSZ, PVCSZ-SH after DTT treatment, and gold supported silicate thin film after hydrolysis.

The synthesized BCP PEO-ss-PVCSZ was treated with a 0.1 M DTT solution in acetonitrile in order to cleave the disulfide bond under mild conditions. The cleavage of the PVCSZ-SH block was confirmed using a dialysis membrane with 10 K molecular weight cutoff. The thiol functionalized PVCSZ block was analyzed by $^1$H NMR, GPC and FT-IR. GPC analysis confirmed the clean cleavage and removal of the PEO block (FIG. 3), and $^1$H NMR showed disappearance of PEO corresponding signal at $\delta$=3.4~3.7 ppm indicative of the removal of the block.

Finally, the self-assembled PEO-ss-PVCSZ thin films were immersed in a 0.1 M DTT solution in ethanol for 10 hr after UV stabilization, and the remaining PEO was washed off with ethanol in the inorganic PVCSZ-SH block on the surface to give the thiol functionalized nanoporous film.

The removal of the PEO block from the manufactured thin film was confirmed using FT-IR spectrum. In the PEO block, peaks corresponding to O—C—O stretching and $CH_2$ (rocking) modes disappeared after DTT treatment.

The AFM image of the manufactured nanoporous thin film showed that the highly oriented surface was preserved after PEO cleavage, and the GISAXS pattern (FIG. 2B) of the nanoporous film exhibited a similar morphology together with an increase in intensity of the rods by a factor 10 and the appearance of visible harmonics in $q_{tp}$ direction. The stronger signal than in the PVCSZ-PEO was caused by an increase in electrical contrast between two phases, which obviously shows the removal of the PEO block.

As shown in the AFM and SEM images, the average pore diameter was about 20 nm, and the thickness was 9~10 nm.

The thickness of the film was adjusted up to 50 nm on the conductive and non-conductive surfaces, and a film about 30 nm thick was more suitable for removal of the PEO block. Self-assembly on a thicker thin film required additional driving force such as surface neutralization, external electricity or magnetic field. The efficiently oriented mesoporous film may be used as a master of nanoimprint lithography to replicate fine structures on a large surface or as a data storage device in nanoelectronic applications.

A process of manufacturing a mesoporous silicate thin film which is vertically aligned and functionalized via simple phase conversion is illustrated in FIG. 1.

The thiol functionalized mesoporous thin films were exposed at different time intervals at room temperature in an aqueous ammonia atmosphere, and samples were observed using FT-IR spectrum. After 5 hr, Si—H ($2150\ cm^{-1}$) and N—H ($3400\ cm^{-1}$) absorption peaks completely disappeared, and new broad peaks corresponding to Si—O—Si asymmetric stretching at $1200\ cm^{-1}$ and $1080\ cm^{-1}$ appeared.

The hydrolyzed thin film was observed at different ammonia treatment times using XPS (X-ray photoelectron spectroscopy), from which complete conversion of the inorganic block into a silicate form ($SiO_xC_y$) in an ammonia atmosphere was confirmed.

Depending on an increase in the exposure time, the oxygen concentration increased (4.5 to 35.6%), and the nitrogen concentration decreased (24.2 to 0.1%). The phase conversion process was active for initial 3 hr, and was almost completed at 5 hr.

As seen in FIGS. 2C and 2F showing the results of GISAXS and AFM image after hydrolysis, there was only slight change in the mesoporous structure and orientation during hydrolysis in a basic solution, which verified high chemical and mechanical robustness of the manufactured silicate nanoporous thin film, unlike the fragile sol-gel network.

Also, the hydrolyzed silicate structure was stable under air up to 250° C., and was stable up to 700° C. under nitrogen flow without any major structural deformation.

The hydrolyzed silicate thin film was immersed in a metal precursor solution such as $HAuCl_4$ (in ethanol), $AgNO_3$ (in water) and $Pd(OAc)_2$ (in ethanol), and the metal ions were immobilized on the surface of the thiol group and reduced by hydrazine.

The metal supported thin films were investigated using GISAXS, and the lattice constants and intensities of these films were found to be consistent with those of metal unloaded films. The presence of metal particles was confirmed using TEM.

The reduced metal nanoparticles were selectively immobilized in nanowells. The size of the metal nanoparticles in the nanowells was measured to be about 2~3 nm via XRD analysis.

Application of Thin Film

As an example, a fixed-bed microreactor was manufactured using a mesoporous silicate thin film in which metal nanoparticles were site-selectively immobilized on the inner walls of mesopores, and various heterogeneous catalytic reactions were carried out using the reactor.

As a comparative example, a plain microreactor was manufactured using a thin film in which metal nanoparticles were randomly deposited on a —SH terminated PVCSZ homopolymer film, and various heterogeneous catalytic reactions were carried out using the reactor.

The —SH terminated homopolymer was prepared via a nucleophilic cleavage reaction using N-ethylpiperidine hydrophosphite at room temperature for 12 hr, and PVCSZ was modified with a dithiocarbamate compound using a RAFT process to form a thiol group at the terminal thereof. The solvent/chemical resistance of the thin film morphology was evaluated via AFM analysis after immersion of the film in various solvents for several hours.

Catalytic Epoxidation

In Table 1, a fixed-bed microreactor had superior performance in terms of styrene oxide to that of a plain microreactor, and exhibited a selectivity of about 75% and a conversion of about 93% at an elevated temperature (80° C.) for a reaction time of 10 min.

In order to manifest thermal stability of a catalytic system using gold, a gold supported mesostructured silicate film was annealed at 250° C. in an air atmosphere, after which the identical reactions were carried out under the same conditions. Annealing had no influence on the conversion and the selectivity (Tables 1 and 2). This result indicates the confinement of gold in the silicate nanopores is effective at preventing undesirable aggregation between metal nanoparticles.

Reduction of Levulinic Acid into Valerolactone

Using in-situ generated hydrogen gas, levulinic acid was subjected to reductive conversion into valerolactone at a high temperature up to 140° C. This reaction process is an important biomass conversion process which produces a versatile intermediate compound.

The reaction efficiency in the plain microreactor was about 70~78% due to the aggregation of metal particles. However, the silicate thin film fixed-bed microreactor decorated with Au nanoparticles exhibited very improved performance approximating to 98.0% for short reaction time (<7 min) as summarized in FIGS. 2A to 2F.

Decomposition of Formic Acid and Production of Hydrogen

The turnover frequency of the fixed-bed microreactor was about 20823 $hr^{-1}$ at a reaction time of 7 min. However, the plain microreactor represented 11249 $hr^{-1}$.

Furthermore, there was only slight deviation in the product yields during repeated reactions for 10 hr, and no catalyst was leached at high temperature.

Synthesis of PEO-Ss-PVCSZ BCP

In a clean and dried Schlenk tube, a mixture comprising a PEO-RAFT macroinitiator (1.0 g, 0.2 mmol), PVCSZ (polyvinylcyclicsilazane, KiON VL20) (3.5 g, 13.3 mmol), and AIBN (azobisisobutyronitrile) (5 mg, 0.036 mmol) was placed under flow of argon gas, and the mixture was diluted with 2 ml of dry benzene, and degassed by performing three freeze-pump-thaw cycles. The reaction mixture was sealed and heated in an oil bath at 90° C. for 15 hr. The reaction temperature is regarded as important because higher temperature leads to crosslinkage or gel. The obtained reaction mixture was cooled to room temperature, diluted with 5 ml of dichloromethane, and precipitated in n-hexane, thus forming a PEO-ss-PVCSZ diblock copolymer as a yellow solid. The block copolymer was dissolved in 50 ml of acetonitrile, and transferred into a cellulose dialysis membrane (10 k molecular weight cutoff), and dialysis continued for 24 hr to remove an unreacted PEO homopolymer. Finally, the polymer solution was concentrated at room temperature, yielding a solid polymer (yield: ~20%).

Manufacture of Thin Film and Self-Assembling of BCP

PEO-ss-PVCSZ BCP was dissolved in anhydrous benzene to prepare a 0.4% solution, which was then applied on a silicon or indium tin oxide wafer at 2000 rpm for 30 sec using spin coating. Subsequently, the thin film was annealed in a closed vessel under a saturated benzene atmosphere for 4 hr and then under moisture (RH-65%) for 1 hr at room temperature. The self-assembled thin film was exposed to UV light for 30 min and thus stabilized or cured. To cleave the PEO block, the thin film was immersed in a 0.1 M DTT (dithiothreitol) solution in reagent grade ethanol for 10 hr and then rinsed with ethanol.

Conversion of Self-Assembled PVCSZ-SH Nanopore Array into Silicate Phase

About 10 ml of 30% aqueous ammonia was stored in an air tight vessel, and the thin film was suspended within 5 hr. A set of experiments were implemented to check the hydrolyzed sample at different intervals by XPS and FT-IR.

Metal Decoration in Pore

A nanoporous film was immersed in a 1 wt % metal precursor solution such as $HAuCl_4$ (in ethanol), $AgNO_3$ (in water) and $Pd(OAc)_2$ (in ethanol) for 1 hr, and then rinsed with water. Thereafter, the metal precursor was immersed in a 1% hydrazine aqueous solution and thus reduced, and then rinsed with water.

Reaction Using Heterogeneous Microreactor

Reactions were carried out by means of the fixed-bed microreactor using self-assembled gold nanoparticles, and the plain microreactor having randomly supported gold nanoparticles. Each reaction was performed in two microreactors with the same feedstock.

For styrene oxidation, a stock solution of styrene (1 mmol) and ter-BuOOH (2 mmol) in toluene was fed at different flow rates using a syringe pump via the fixed-bed microreactor and the plain microreactor.

For hydrogenation of luvelunic acid (LA), a stock solution was prepared by mixing LA (10 mmol) and formic acid (10 mmol) in a DMF solvent, and reacted at different temperatures. The catalytic activity was evaluated by feeding the stock solution using a HPLC pump (back pressure regulator at flow rates 5.0 μl/min). The product was analyzed via gas chromatography (GC/MS, Agilent 5975 GC/MSD system) using n-dodecane as an internal standard.

Manufacture of Fixed-Bed Reactor:

A PDMS resin and a curing agent (Sylgard 184, DowCorning) were mixed at a ratio of 10:1, poured onto a Si master having predetermined SU-8 photoresist patterned channel, and baked at 70° C. for 1 hr. Subsequently, the PDMS channel (45 cm long, 500 μm with) was peeled off and coated with polyvinylsilazane (HTT 1800, KiON Corp.) to form a protective film (~20 μm) on the PDMS from the organic solvent, and stamped on the gold supported mesoporous silicate thin film. The entire device with an inlet and an outlet was irradiated under UV for 10 min, and baked at 150° C. for 4 hr.

Manufacture of Plain Microreactor:

About 5 g of PVCSZ (KiON VL20), 93 mg of AIBN and 462 mg of 4-diethylthiocarbamoyl-sulfanylmethyl-benzoic acid (DTBA) and 3 ml of THF were placed in a Schlenk tube. The tube was heated at 80° C. for 20 hr. Then, 20 mg of N-ethylpiperidine hypophosphite was added and the resulting mixture was stirred at room temperature for 12 hr, thus obtaining a thiol end capped PVCSZ homopolymer.

The polymer was diluted with benzene/toluene, applied on a silicon wafer using spin coating, and cured under UV light for 30 min. The polymer-coated silicon wafer was immersed in a 1 wt % metal precursor solution (HAuCl4 (in ethanol)) for 1 hr, rinsed with water, reduced with a 1% hydrazine solution and further rinsed with water. Then, a PDMS channel (45 cm long, 500 μm with) was manufactured and coated with polyvinylsilazane (HTT 1800, KiON Corp.) to form a protective layer (~20 μm) on the PDMS from the organic solvent, and then stamped on a gold supported silicate thin film. The entire device with an inlet and an outlet was irradiated under UV for min, and baked at 150° C. for 4 hr.

Scheme 1.
Synthetic route of diblock copolymer PEO-ss-PVCSZ with disulfide link

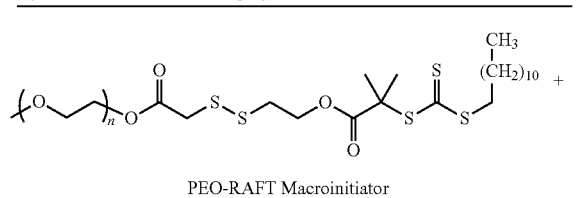

PEO-RAFT Macroinitiator

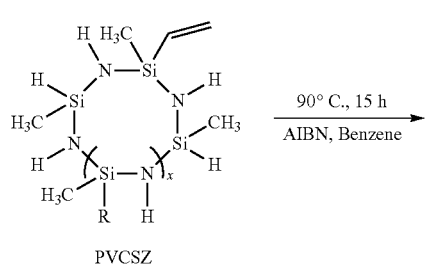

PVCSZ

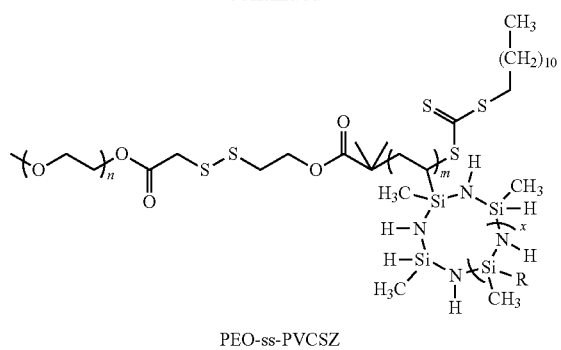

PEO-ss-PVCSZ

R = H or Vinyl group
X = 1 to 20

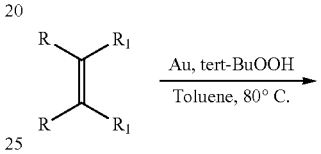

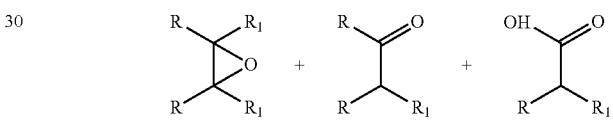

TABLE 1

Heterogeneous catalytic epoxidation of olefins in a fixed-bed microreactor incorporated with Au metal in the mesoporous silicate thin film, in comparison to bulk reaction and plain microreactor.

| Entry | Bulk reaction for 6 h % Yield (selectivity)[a] | Reaction Time (min) | Plain microreactor % yield (selectivity)[a] | Fixed microreactor % yield (selectivity)[a] | Fixed bed microreactor[b] % yield (selectivity)[a] |
|---|---|---|---|---|---|
| 1 | 60(65:45) | 2 | 40.4(70:30) | 78.5(74:26) | 75.5(75:25) |
| 2 | — | 5 | 53.2(70:30) | 80.9(75:25) | 81.0(76:24) |
| 3 | — | 10 | 64.3(72:28) | 93.6(75:25) | 92.0(75:25) |

Reaction conditions: substrate (1 mmol), tert-BuOOH (2 mmol), toluene at: 80° C.

[a]Conversion and selectivity were determined by GCMS.

[b]Fixed bed microreactor was fabricated using thermal treated silicate thin film at 250° C. in air.

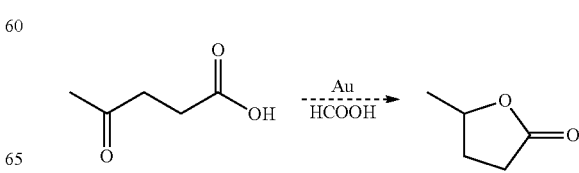

TABLE 2

Hydrogenation of levulinic acid (LA) in a fixed-bed microreactor incorporated with Au metal in the mesoporous silicate thin film, in comparison to bulk reaction and plain microreactor.

| Entry | Reactant | Temperature (°C.) | Bulk reaction for 6 h (Yield, %)[a] | Reaction Time (min) | Plain microreactor (Yield, %)[a] | Fixed bed microreactor (Yield, %)[a] |
| --- | --- | --- | --- | --- | --- | --- |
| 1 | LA | 80 | 50.0 | 5 | 70.7 | 88.0 |
|   |    |    |      | 7 | 75.8 | 96.8 |
| 2 | LA | 120 | 48.5 | 5 | 71.4 | 90.4 |
|   |    |    |      | 7 | 74.5 | 98.0 |
| 3 | LA | 140 | 46.0 | 5 | 69.6 | 95.0 |
|   |    |    |      | 7 | 78.7 | 98.6 |

Reaction conditions: Reactants (10 mmol), HCOOH (10 mmol), DMF solvent.
[a]Yield was determined by GCMS with n-dodecane as an internal standard.

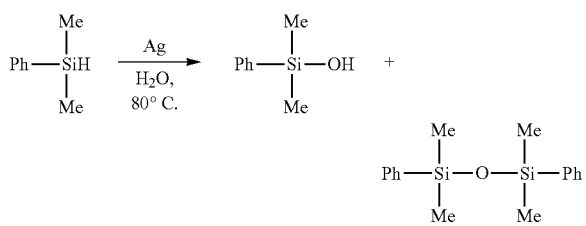

TABLE 3

Silver catalyzed selective oxidation of aromatic silane to silanol.

| Entry | Reaction Time (min) | Plain microreactor % yield (selectivity)[a] | Fixed microreactor % yield (selectivity)[a] |
| --- | --- | --- | --- |
| 1 | 2 | 80(99:1) | 95(99:1) |
| 2 | 5 | 85(99:1) | 99(99:1) |

Reaction conditions: substrate dimethylphenylsilane (1 mmol),
[a]Conversion and selectivity were determined by GCMS.

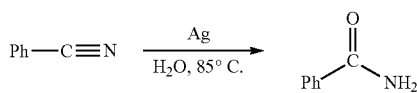

TABLE 4

Silver catalyzed selective hydration of aromatic nitrile to amide.

| Entry | Reaction Time (min) | Plain microreactor % yield (selectivity)[a] | Fixed microreactor % yield (selectivity)[a] |
| --- | --- | --- | --- |
| 1 | 3 | 81 | 92 |
| 2 | 7 | 85 | 99 |

Reaction conditions: substrate phenylnitrile (1 mmol),
[a]Conversion and selectivity were determined by GCMS.

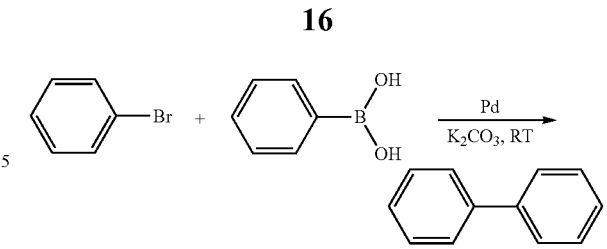

TABLE 5

Palladium catalyzed Suzuki coupling of Bromobenzene

| Entry | Reaction Time (min) | Plain microreactor % yield (selectivity)[a] | Fixed microreactor % yield (selectivity)[a] |
| --- | --- | --- | --- |
| 1 | 3 | 80 | 95 |
| 2 | 5 | 92 | 99 |

Reaction conditions: substrate (1 mmol), methanol as solvent.
[a]Conversion and selectivity were determined by GCMS.

The invention claimed is:

1. A method of manufacturing a ceramic thin film having mesopores, comprising:
   self-assembling a block copolymer including at least one inorganic block which is linked with another block by a disulfide bridge and is converted into a ceramic;
   cleaving the disulfide bridge and removing a portion of the block copolymer other than the inorganic block; and
   converting the inorganic block into a ceramic phase.

2. The method of claim 1, wherein the inorganic block is selected from the group consisting of a polycarbosilane block, a polysilazane block, a polyborazine block, a polysilsessiloxane block, an allylperhydropolycarbosilane block, a polyvinylsilazane block, a polyvinylcyclicsilazane block, polysilane (—(R$_2$Si)n-), polysiloxane (—(R$_2$SiO)n-), aluminum amide (=AlNR-)n), and poly titanium imide (=Ti(NR$_2$)—), wherein R is C1~20 alkyl.

3. The method of claim 1, wherein the mesopores are provided in a form of cylinders vertically aligned side by side.

4. The method of claim 1, wherein the block copolymer is an organic-inorganic block copolymer linked by the disulfide bridge.

5. The method of claim 1, wherein an organic-inorganic block copolymer is polyethyleneoxide-polyvinylcyclicsilazane bridged by disulfide.

6. The method of any one of claims 1 to 5, wherein self-assembling the block copolymer is performed using solvent annealing.

7. The method of any one of claims 1 to 5, wherein converting the inorganic block into the ceramic phase is performed using hydrolysis.

8. The method of any one of claims 1 to 5, further comprising curing the inorganic block.

9. The method of any one of claims 1 to 5, wherein the mesopores are impregnated with a metal to form a reactive thin film.

10. The method of any one of claims 1 to 5, wherein the thin film is formed on a conductive or non-conductive substrate.

11. A method of manufacturing a mesoporous thin film, comprising:
    self-assembling a block copolymer including at least one inorganic block which is linked by a disulfide bridge and is converted into a ceramic and an organic block so that vertical cylinders 2~50 nm thick are formed by the organic block; and cleaving the disulfide bridge to remove the organic block, thus forming mesopores.

* * * * *